US012699195B2

(12) United States Patent
Burgess et al.

(10) Patent No.: US 12,699,195 B2
(45) Date of Patent: Aug. 4, 2026

(54) SEISMIC WAVEFIELD MODELING HONORING AVO/AVA WITH APPLICATIONS TO FULL WAVEFORM INVERSION AND LEAST-SQUARES IMAGING

(71) Applicant: DUG Technology (Australia) Pty Ltd., West Perth (AU)

(72) Inventors: Timothy Burgess, Subiaco (AU); James McLeman, Subiaco (AU); Mrinal Sinha, East Perth (AU); Gary Hampson, Peppermint Grove (AU); Troy Thompson, Duncraig (AU)

(73) Assignee: DUG Technology (Australia) Pty Ltd., West Perth (AU)

( * ) Notice: Subject to any disclaimer, the term of this patent is extended or adjusted under 35 U.S.C. 154(b) by 430 days.

(21) Appl. No.: 18/063,587

(22) Filed: Dec. 8, 2022

(65) Prior Publication Data
US 2023/0114991 A1 Apr. 13, 2023

Related U.S. Application Data

(63) Continuation of application No. PCT/US2021/036694, filed on Jun. 9, 2021.
(Continued)

(51) Int. Cl.
*G01V 1/28* (2006.01)
*G01V 1/30* (2006.01)
*G01V 1/32* (2006.01)

(52) U.S. Cl.
CPC .............. *G01V 1/282* (2013.01); *G01V 1/303* (2013.01); *G01V 1/306* (2013.01); *G01V 1/32* (2013.01);
(Continued)

(58) Field of Classification Search
CPC ........ G01V 1/282; G01V 1/303; G01V 1/306; G01V 1/32; G01V 2210/614;
(Continued)

(56) References Cited

U.S. PATENT DOCUMENTS 10,310,113 B2 * 6/2019 Sun ........................ G01V 1/303
10,620,331 B2 * 4/2020 Sun ........................ G01V 1/282
(Continued)

FOREIGN PATENT DOCUMENTS

EP        3761067 A1    1/2021
WO    2021071947 A1    4/2021

OTHER PUBLICATIONS

International Search Report and Written Opinion, International Application No. PCT/US2021/036694 dated Oct. 20, 2021.
(Continued)

*Primary Examiner* — Elias Desta
(74) *Attorney, Agent, or Firm* — Richard A. Fagin

(57) ABSTRACT

A method for modelling and migrating seismic data, that includes using an acoustic wave equation and a spatial distribution of one or more earth-model parameters. The acoustic wave equation is modified by including at least one secondary source term, and based on a seismic acquisition configuration, either calculating the seismic signals that would be detected from the modelled wavefield or migrating observed seismic signals or migrating residual signals as part of an inversion.

50 Claims, 4 Drawing Sheets

Related U.S. Application Data

(60) Provisional application No. 63/037,632, filed on Jun. 11, 2020.

(52) U.S. Cl.
CPC .................. *G01V 2210/614* (2013.01); *G01V 2210/6224* (2013.01); *G01V 2210/632* (2013.01); *G01V 2210/645* (2013.01)

(58) Field of Classification Search
CPC ..... G01V 2210/6224; G01V 2210/632; G01V 2210/645
See application file for complete search history.

(56) References Cited

U.S. PATENT DOCUMENTS

| | | | |
|---|---|---|---|
| 11,346,967 B2 * | 5/2022 | Tan ........................ | G01V 1/301 |
| 2014/0350861 A1 | 11/2014 | Wang et al. | |
| 2015/0276956 A1 | 10/2015 | Khalil et al. | |
| 2018/0156932 A1 * | 6/2018 | Sain ........................ | G01V 1/282 |
| 2019/0187312 A1 | 6/2019 | Ramox-Martinez et al. | |
| 2020/0132873 A1 | 4/2020 | Wang et al. | |

OTHER PUBLICATIONS

Dafni Raanan et al.: "Asymptotic inversion of the variable density acoustic model", SEG technical program expanded abstracts 2018, Aug. 27, 2018.

Extended European Search Report dated May 3, 2024, for European application No. 21822312.1.

Examination Report dated Dec. 4, 2023, for Australian Application No. 2021289471.

Communication pursuant to Article 94(3) EPC dated Jul. 4, 2025, European Patent Application No. 21822312.1.

Substantive Examination Adverse Report (Section 30(1)), notified to Applicant May 13, 2026, Malaysian Patent Application No. PI2022007026.

Examiner's Report to the Registrar, notified to Applicant May 13, 2026, Malaysian Patent Application No. PI2022007026.

* cited by examiner

SEISMIC WAVEFIELD MODELING HONORING AVO/AVA WITH APPLICATIONS TO FULL WAVEFORM INVERSION AND LEAST-SQUARES IMAGING

CROSS REFERENCE TO RELATED APPLICATIONS

Continuation of International Application No. PCT/US2021/036694 filed on Jun. 9, 2021. Priority is claimed from U.S. Provisional Application No. 63/037,632 filed on Jun. 11, 2020. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic exploration of the Earth's subsurface. More specifically, the disclosure relates to methods for processing seismic signals to infer structure and composition of subsurface formations.

Seismic acquisition uses one or more seismic energy sources to impart seismic energy into the Earth, which propagates outward from the source(s) as a seismic wavefield and scatters off any elastic (geological) heterogeneities in the propagation path. As a result of the interaction between the seismic wavefield and the elastic heterogeneities, some of the seismic energy returns to one or more seismic sensors or receivers, where the returning energy is detected and converted into signals. Recording equipment connected to the receiver(s) records the amplitude of the detected energy at the receivers as a function of time. The source(s) can include, but are not limited to, compressed air guns, vibratory transducers, explosives or natural sources. The receiver(s) measure physical attributes of the detected energy wavefields such as pressure or its time derivative, and/or motion related attributes such as particle velocity or particle acceleration. The recorded signals may comprise a superposition of a number of types of waves, such as reflections, refractions, and converted waves. These types of waves are used in a range of data processing techniques to help estimate parameters that correspond to the composition and structure of the Earth. These estimated or 'earth-model' parameters may include, but are not limited to, velocity (wave speed), density, seismic anisotropy, acoustic impedance, elastic impedance and attenuation.

It is possible to describe a second class of model parameters which are not directly related to bulk properties of the subsurface at each location but instead quantify changes in behavior between different regions of the subsurface. For example, it is possible to define a "reflectivity" parameter which is nonzero at locations in the subsurface where there are contrasts in the nature of acoustic propagation. This might be done, for example, to allow modelling of reflections without needing to ascribe the reflected signal to a change in one particular rock property. In this class of model parameters, amplitude versus offset/angle (AVO/A) parameters seek to describe the nature of scattering from each point in the subsurface in terms of how its amplitude changes depending on the angle of incidence to the contrast interface. AVO/A is typically characterized by parameters including 'intercept', 'gradient' and 'curvature.' These AVO/A parameters are of particular interest because they are indicators of lithology (formation mineral composition) and pore content (i.e., what material fills the pore spaces in porous formations), which is of considerable use in hydrocarbon exploration and in monitoring hydrocarbon production.

One method of estimating earth model parameters in a model is known as Full Waveform Inversion (FWI) (see, Tarantola 1984; Plessix, 2006). FWI has as an objective to find a high resolution image of the earth model parameters that best explains the entire recorded seismic data wavefield, that is, the measured seismic signals made in a particular survey over the area to which the earth model applies. A form of the wave equation is used to model synthetic seismic data based on a seismic acquisition configuration (an arrangement of seismic source(s) and receivers) and an initial parameter-model or earth-model. Synthetic seismic data represent the seismic signals that would be measured at the receivers if the acquisition configuration were used on an area of the subsurface having seismic properties spatially distributed according to the model. The modeled seismic data are then compared with the recorded (that is the measured or observed) seismic data, and any differences between the observed and measured seismic data are assumed to be the result of errors in the initial estimate of the parameter model, that is, differences between the model and the actual spatial distribution of parameters in the subsurface area. The differences between the modeled seismic data and the recorded seismic data are termed the 'residual' vector. One way to characterize the 'size' of the residual vector is by its 'L2 norm', the square of which can be used as a cost or objective function in an inversion algorithm. The goal of such an inversion is to find the model parameters which minimize the objective function; this means that the modeled seismic data matches the recorded seismic data as closely as possible in the least squares sense. Supposing the model parameters were not yet optimum then it would be necessary to change the model parameters in such a way that would reduce the L2 norm of the residual in subsequent calculations of the synthetic seismic data. Application of the adjoint wave equation ('migration') to the residual vector results in a vector containing the gradient of the objective function with respect to the model parameters; the gradient indicates in which direction the parameters need to change to reduce the L2 norm. A new, updated set of model parameters may be produced by an optimization algorithm, e.g., steepest descent, conjugate gradient or L-BFGS (limited memory Broyden-Fletcher-Goldfarb-Shanno algorithm) using this gradient vector. These steps are then repeated until the L2 norm is small enough, or some other termination criterion is satisfied. Formally, the objective function (in this example) is described by the expression:

$$J = \frac{1}{2}\|L(m) - d\|_2^2 \tag{1}$$

where J is the objective function, L(m) is an operator which is a form of the wave equation that describes how to synthesize seismic data from the model parameter(s), m.

The accuracy of the earth-model parameter(s) and the form of wave equation used in L(m) determine how accurately the modeled data matches the observed (recorded) seismic data.

In the case that L is a linear operator the conventional migration operator, $L^T$, is the adjoint of the forward modelling wave equation which is applied to the data as, $L^T d$. The same operator is used in FWI to project the residual energy into image space as the gradient of the objective function with respect to the parameters. This is easily shown because:

$$\frac{\partial J}{\partial m} = \frac{\partial}{\partial m} \frac{1}{2} \|Lm - d\|_2^2 \qquad (2)$$
$$= L^T(Lm - d)$$

This gradient can be thought of as a back-projection of the errors across the regions of the model that need to be modified. The gradient contains three types of phenomena, which are illustrated in FIG. 1.

1. Diving wave-paths; (also known as 'transmission wave-paths') are colloquially known as 'bananas' because in three dimensions they resemble hollow bananas. The curvature derives from the vertical velocity gradient typically found in sedimentary rocks. Each banana is centered on the Fermat path between the seismic source and the particular receiver. The thickness of the banana depends upon the frequency and the length of the Fermat path. It is often considered to be a 'fat' or band-limited ray. Bananas typically do not penetrate deeply into the Earth unless there is enough offset between the source and the receiver. As a result, in FWI, bananas are predominantly used to update the shallower parts of the model.

2. Reflection wave-paths; colloquially known as 'rabbit ears', even though they are more like two halves of a banana. One ear joins the source to a specular reflector while the other ear joins the specular reflector to the receiver. They are centered on the Fermat path joining source-reflector-receiver. This class of phenomenon only occurs if there is sufficient model heterogeneity for the wave equation to generate reflections. Any curvature in each ear derives from the background velocity variation. The thickness of the ear depends upon the frequency and the length of the Fermat path. It is often considered to be a 'fat' or band-limited reflection event ray. Rabbit ears will be generated to any depth in the model so long as model heterogeneities are sufficient to generate reflections. As a result, although rabbit ears are useful at any depth in the model, they are most useful in the deeper regions where bananas fail to penetrate.

3. Reflections; these are the reflections that would be observed in a migrated image. They occur at the base of the rabbit's ears as the classical migration 'smile'.

In general, the FWI gradient contains a superposition of many wavepaths and reflections. Some version of the superposed wavepaths, modified by the particular optimization algorithm, is the correction that needs to be added to the earth-model parameters in order to improve the fit (i.e., reduce differences) with the real (as acquired) seismic data. A simplified view would be that updates may be formed by adding many bananas and rabbit ears to the earth-model parameters. A complicating factor is that diving waves are usually more energetic than reflections and so bananas can be overwhelmingly dominant in an inversion. Therefore, it is useful to separate the gradient into the foregoing three terms and use each term separately or in some weighted combination in the FWI algorithm. FWI that uses only the reflection wavepath is sometimes termed RWI (reflection waveform inversion).

There exist several ways to control the production of the wavepaths and the reflections. Rabbit ears are only formed if the velocity field (or other parameter fields of the earth model) contains appropriate heterogeneities and energy at the appropriate time exists on the input. Reflections only require energy at an appropriate time to exist on the input. Bananas only require energy at an appropriate time on the input. Therefore, by selecting the input energy and the smoothness of the velocity model it is possible to produce only bananas, only reflections, rabbit ears and reflections or all three. This is summarized in Table 1. Reflections tend to be composed of characteristically higher wavenumbers and so they can be readily separated from the wave-paths by techniques such as wavenumber filtering. Rabbit ears and bananas tend to be generated by data that occurs at different times with different dips. This allows separation using techniques such as data-domain masking and wave-number filtering.

TABLE 1

| The conditions required to produce the 3 components in the FWI gradient. | | |
| --- | --- | --- |
| FWI Gradient component | Residual energy | Velocity field |
| Bananas | first break/diving wave | smooth or heterogeneous |
| Rabbit ears | reflection energy | heterogeneous |
| Reflection | reflection energy | smooth or heterogeneous |

The transport of energy by the wave-equation is termed kinematics. Most of the kinematics can be obtained by using a smooth velocity field (i.e., a field lacking abrupt changes). In contrast, reflection or scattering takes place predominantly at sharp changes in the velocity or other parameter fields. This aspect of wave-equation behavior is often termed dynamics. If the parameter fields contain both a smooth background and sharp higher frequency heterogeneities, then the wave equation naturally produces the kinematics and the dynamics that the particular wave-equation was designed to handle. An alternative approach would be to separate the kinematic behavior from the dynamic behavior. This has distinct advantages because, as will be described further, it is possible to perform the kinematic work of the wave-equation using the standard terms acting on a smoothed velocity field at the same time as generating a range of scattering behavior using additional terms that will also be described further. It has been determined that the range of scattering behavior that can be accommodated is far wider than the behavior ordinarily handled by a particular wave-equation. For example, it will be described herein aspects of elastic wave behavior normally only possible using an elastic wave-equation, that can be modeled using a modified acoustic wave-equation which contains additional terms. "Acoustic wave equation" as used herein is intended to mean a wave equation that cannot propagate both P-waves and S-waves at the same time, while "elastic wave equation" is intended to mean a wave equation that can propagate both of those types of waves at the same time while handling their interactions. The acoustic wave equation can only correctly propagate a subset of possible wave types compared with the elastic wave equation.

In one approach to FWI, the velocity model is separated into a smooth background field (to generate bananas) and a high frequency field. Superposition of some filtered version of the high frequency field onto the smooth velocity field controls whether or not reflection wave-paths and reflections are produced. In such a case, it would be useful in FWI to find the high frequency components of the model by using a wave equation which isolated reflectivity as a separate term.

In some cases Born modelling may be used. In such cases, wave transport is performed in a smooth parameter field in which no scattering takes place. The incident wavefield that travels from the source is coupled to the reflected wavefield only at specified scattering locations. This may be conceptually written $Q^-RQ^+s$ in which s is the source, $Q^+$ is the incident wave transport operator ($Q^+s$ is often termed the "down-going wavefield"), R is the reflectivity operator and $Q^-$ is the reflected wavefield transport operator ($Q^-RQ^+s$ is often termed the "up-going wavefield"). The portion of the incident wavefield that is reflected, $RQ^+s$, is injected into the reflected wavefield. It is useful in such a scheme to maintain the reflectivity and wave transport parameter fields as being independent of each other so that transport and scattering are independently controllable. In Born modelling, secondary source terms can be used to transfer reflected energy from the down-going wavefield to the up-going wavefield along with any directivity appropriate for that particular scattering term.

Although FWI is a powerful tool, it has a high computational cost and in some cases can be prohibitively computationally expensive. To overcome this cost, it is common to use approximations to the wave equation so that only certain parts of the wavefield are well described during modelling. Therefore, even if m were perfectly known, the data modeled using an approximate wave equation would not perfectly match the observed data. An example of a type of wave that is often ignored or poorly approximated is known as converted waves. Converted waves originally travelled as compressional (P) waves, but have partially undergone wave conversion to become shear (S) waves. This conversion occurs when a P-wave is incident upon a boundary between two different elastic materials. Some of the energy is transmitted through the boundary between the two materials, while some is reflected off the boundary. Some of the energy radiating away from the boundary will be converted into shear waves. This phenomenon is illustrated in FIG. 2. The precise behavior depends upon the wave's angle of incidence on the boundary and the elastic properties of the two materials (see, Zoeppritz, 1919; Aki & Richards, 1980). As a result, the reflected P-waves show diagnostic changes in amplitude as a function of reflection angle, which is at the heart of AVO/A analysis.

In the absence of anisotropy the travel-time behavior (kinematics) of P-waves does not depend on either the S-wave velocity ($v_s$) or the density ($\rho$) of the elastic medium, but only on the P-wave velocity. Therefore, it is possible to model compressional (P-wave) wavefield kinematics adequately using a relatively simple, constant-density acoustic wave equation. The influence of shear velocity and density on the compressional wavefield, however, changes the amplitudes (dynamics). If such amplitudes are deemed to be important then it is necessary to use a more accurate elastic wave equation, which is significantly more computationally expensive. The use of the elastic wave equation properly accounts for elastic energy conservation and the boundary conditions at the interface (boundary) between the media. Using the elastic wave equation correctly allows the right fraction of the incident energy to be partitioned between the reflected and transmitted shear and compressional modes across the interface. This means that if there is interest in the shear wave velocity and density then it is necessary to use an adequate wave equation that correctly produces the dynamics of the compressional wavefield. The additional expense of using an elastic wave equation would be exacerbated inside an elastic FWI because of the iterative use of the elastic wave equation and its adjoint.

Therefore, it is desirable to have a modified form of the acoustic wave equation that can accurately mimic elastic wave equation behavior such as AVO/A, and can be conveniently and efficiently implemented by convolution with finite difference stencils. It follows that such an equation used in conjunction with its adjoint wave equation may be used in a FWI scheme that can determine not only the propagation velocity, but also the AVO/A generating parameters. It has also been observed that it would be useful in FWI to be able to isolate the reflectivity terms in the wave equation so that it is possible to control the use of reflectivity in the velocity field to selectively generate bananas and/or rabbit ears and reflections.

SUMMARY

One aspect of the present disclosure is a method for modelling and migrating seismic data. A method according to this aspect includes, in a computer, calculating seismic signals that would be observed based on an arrangement of at least one seismic source and at least one seismic receiver and an initial model of Earth's subsurface. The initial model comprises spatial distribution of at least one parameter related to propagation of elastic waves. The calculating comprises entering the initial model into an acoustic wave equation modified by at least one secondary source term. The at least one secondary source term enables estimation of amplitude versus offset and/or angle (AVO/A) phenomena in the calculated seismic signals. The acoustic wave equation can perform the estimated only when modified by the at least one secondary source term. The calculated seismic signals are compared with measured seismic signals obtained using the arrangement. Differences are determined between the calculated seismic signals and the measured seismic signals. An inversion method is used to adjust the initial model, and the calculating, comparing and determining are repeated to reduce the determined differences.

In some embodiments, the at least one secondary source term represents reflectivity, which acts to scatter an incident wavefield according to a strength of the at least one secondary source term.

In some embodiments, the reflectivity is due to changes in at least one earth-model parameter.

In some embodiments, the at least one earth-model parameter comprises compressional (P) wave velocity.

In some embodiments, the at least one earth-model parameter comprises shear (S) wave velocity.

In some embodiments, the at least one earth-model parameter comprises density.

In some embodiments, at least one earth-model parameter comprises compressional (P) wave impedance.

In some embodiments, the at least one earth-model parameter comprises shear (S) wave impedance.

In some embodiments, the at least one earth-model parameter comprises elastic impedance.

In some embodiments, the at least one earth-model parameter comprises one or more components of the elastic tensor.

In some embodiments, the at least one earth-model parameter comprises attenuation.

Some embodiments further comprise performing full waveform inversion to determine reflectivity and kinematics substantially separately.

Some embodiments further comprise producing a reflectivity image.

Some embodiments further comprise selectively modifying the one or more earth-model parameters and/or the strength of the at least one secondary source term in order to control the production of diving wave-paths (bananas) and reflection wave-paths (rabbit ears) as substantially separate terms in the gradient of an objective function of a full waveform inversion.

Some embodiments further comprise selectively modifying the one or more earth-model parameters and/or the strength of the at least one secondary source term in order to substantially produce only diving wave-paths (bananas) in the gradient of an objective function of a full waveform inversion.

Some embodiments further comprise selectively modifying the one or more earth-model parameters and/or the strength of the at least one secondary source term in order to substantially produce only reflection wave-paths (rabbit ears) in the gradient of an objective function of a full waveform inversion.

In some embodiments, the at least one secondary source term effectively reflects or scatters an incident wavefield with directional variations.

In some embodiments, the at least one secondary source term represents reflectivity corresponding to an AVO/A intercept attribute.

Some embodiments further comprise performing full waveform inversion to determine the AVO/A intercept attribute.

In some embodiments, the at least one secondary source term represents reflectivity corresponding to an AVO/A gradient attribute.

Some embodiments further comprise performing full waveform inversion to determine the AVO/A gradient attribute.

In some embodiments, the at least one secondary source term represents reflectivity corresponding to an AVO/A curvature attribute.

Some embodiments further comprise performing full waveform inversion to determine the AVO/A curvature attribute.

Some embodiments further comprise injecting resulting secondary source terms into a second wavefield.

Some embodiments further comprise Born modelling.

In some embodiments, a termination criterion of the inversion method is given by a predetermined number of repetitions.

In some embodiments, a termination criterion of the inversion is given by a predetermined similarity between the calculated and measured signals.

Another aspect of the present disclosure is a non-transitory computer readable medium having stored thereon a computer program. The computer program according to this aspect has logic operable to cause a programmable computer to perform actions, comprising calculating seismic signals that would be observed based on an arrangement of at least one seismic source and at least one seismic receiver and an initial model of Earth's subsurface. The initial model comprises spatial distribution of at least one parameter related to propagation of elastic waves. The calculating comprises entering the initial model into an acoustic wave equation modified by at least one secondary source term. The at least one secondary source term enables estimation of amplitude versus offset and/or angle (AVO/A) phenomena in the calculated seismic signals. The acoustic wave equation can perform the estimation only when modified by the at least one secondary source term. The calculated seismic signals are compared with measured seismic signals obtained using the arrangement. Differences are determined between the calculated seismic signals and the measured seismic signals. An inversion method is used to adjust the initial model, and the calculating, comparing and determining are repeated to reduce the determined differences. In some embodiments, the at least one secondary source term represents reflectivity, which acts to scatter an incident wavefield according to a strength of the at least one secondary source term.

In some embodiments, the reflectivity is due to changes in at least one earth-model parameter.

In some embodiments, the at least one earth-model parameter comprises compressional (P) wave velocity.

In some embodiments, the at least one earth-model parameter comprises shear (S) wave velocity.

In some embodiments, the at least one earth-model parameter comprises density.

In some embodiments, at least one earth-model parameter comprises compressional (P) wave impedance.

In some embodiments, the at least one earth-model parameter comprises shear (S) wave impedance.

In some embodiments, the at least one earth-model parameter comprises elastic impedance.

In some embodiments, the at least one earth-model parameter comprises one or more components of the elastic tensor.

In some embodiments, the at least one earth-model parameter comprises attenuation.

In some embodiments, the logic is further operable to cause the programmable computer to perform full waveform inversion to determine reflectivity and kinematics substantially separately.

In some embodiments, the logic is further operable to cause the programmable computer to perform producing a reflectivity image.

In some embodiments, the logic is further operable to cause the programmable computer to perform selectively modifying the one or more earth-model parameters and/or the strength of the at least one secondary source term in order to control the production of diving wave-paths (bananas) and reflection wave-paths (rabbit ears) as substantially separate terms in the gradient of an objective function of a full waveform inversion.

In some embodiments, the logic is further operable to cause the programmable computer to perform selectively modifying the one or more earth-model parameters and/or the strength of the at least one secondary source term in order to substantially produce only diving wave-paths (bananas) in the gradient of an objective function of a full waveform inversion.

In some embodiments, the logic is further operable to cause the programmable computer to perform selectively modifying the one or more earth-model parameters and/or the strength of the at least one secondary source term in order to substantially produce only reflection wave-paths (rabbit ears) in the gradient of an objective function of a full waveform inversion.

In some embodiments, the at least one secondary source term effectively reflects or scatters an incident wavefield with directional variations.

In some embodiments, the at least one secondary source term represents reflectivity corresponding to an AVO/A intercept attribute.

In some embodiments, the logic is further operable to cause the programmable computer to perform performing full waveform inversion to determine the AVO/A intercept attribute.

In some embodiments, the at least one secondary source term represents reflectivity corresponding to an AVO/A gradient attribute.

In some embodiments, the logic is further operable to cause the programmable computer to perform performing full waveform inversion to determine the AVO/A gradient attribute.

In some embodiments, the at least one secondary source term represents reflectivity corresponding to an AVO/A curvature attribute.

In some embodiments, the logic is further operable to cause the programmable computer to perform performing full waveform inversion to determine the AVO/A curvature attribute.

In some embodiments, the logic is further operable to cause the programmable computer to perform injecting resulting secondary source terms into a second wavefield.

In some embodiments, the logic is further operable to cause the programmable computer to perform Born modelling.

In some embodiments, a termination criterion of the inversion method is given by a predetermined number of repetitions.

In some embodiments, a termination criterion of the inversion is given by a predetermined similarity between the calculated and measured signals.

Other aspects and possible advantages will be apparent from the description and claims that follow.

DETAILED DESCRIPTION

Methods according to the present disclosure may be used in connection with seismic data acquired using techniques known in the art. Such techniques comprise deploying one or more seismic energy sources, e.g., air guns or arrays of such guns, vibrators or arrays of vibrators or explosives, at selected locations, or such techniques may use naturally occurring sources. Arrays of seismic sensors or receivers are deployed in selected arrangements and detect seismic energy that ultimately originates from the source(s). An example embodiment of acquiring seismic signals (data) is shown in FIG. 3.

Figure 3:
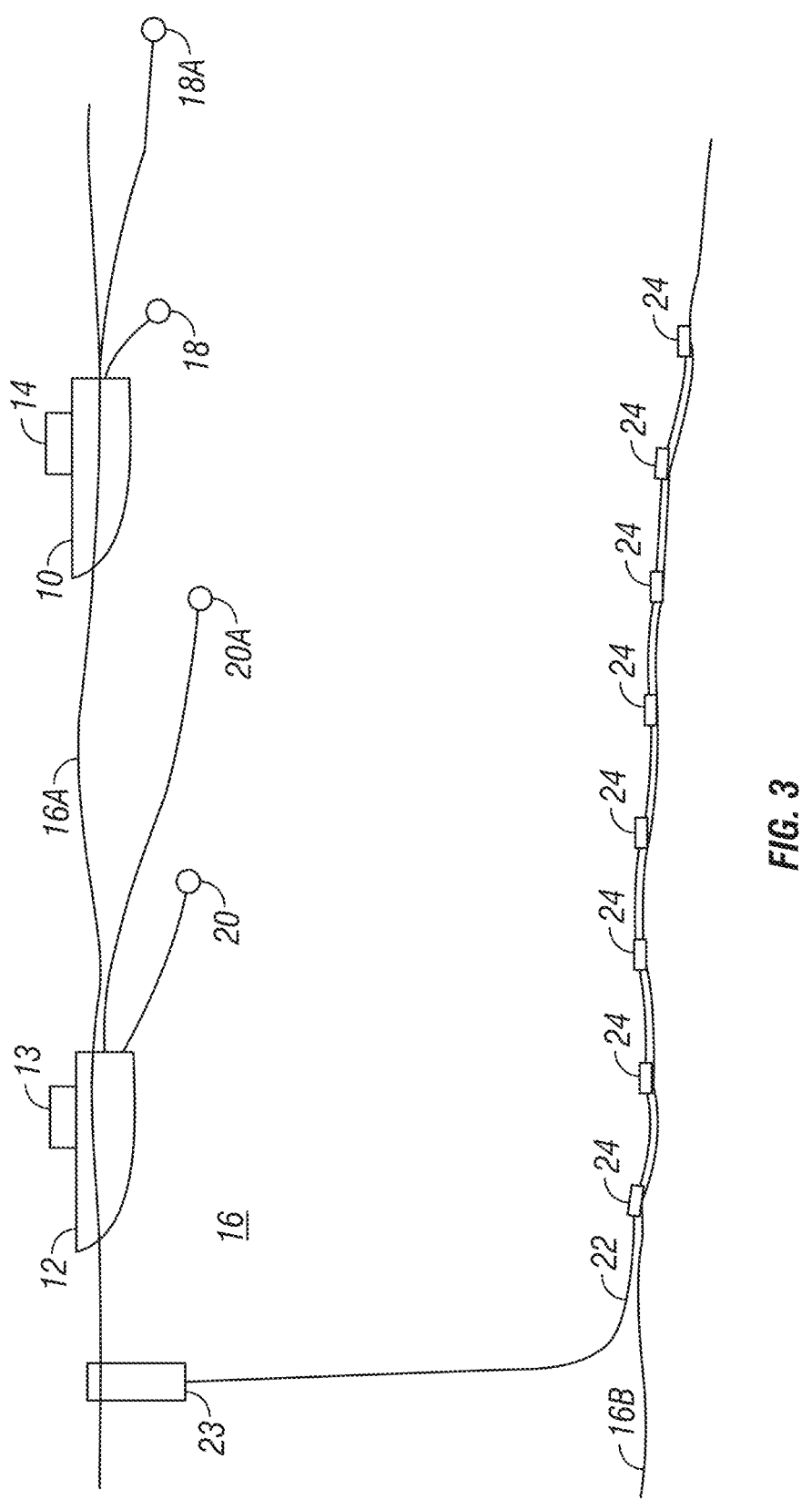
FIG. 3 shows an example embodiment of acquiring seismic signals that may be used in accordance with the present disclosure.

FIG. 3 shows a vertical section view of an ocean bottom cable (OBC) seismic survey being conducted using, for example, two different "source" vessels for towing seismic energy sources. In some embodiments, only one source vessel may be used. According to the present disclosure, any number of source vessels may be used and the following description is not intended to limit the scope of the present disclosure. The source vessels move along the surface 16A of a body of water 16 such as a lake or the ocean. In the present example, a vessel referred to as a "primary source vessel" 10 may include equipment, shown generally at 14, that comprises components or subsystems (none of which is shown separately) for navigation of the primary source vessel 10, for actuation of seismic energy sources and for retrieving and processing seismic signal recordings. The primary source vessel 10 is shown towing two, spaced apart seismic energy sources 18, 18A.

The equipment 14 on the primary source vessel 10 may be in signal communication with corresponding equipment 13 (including similar components to the equipment on the primary source vessel 10) disposed on a vessel referred to as a "secondary source vessel" 12. The secondary source vessel 12 in the present example also tows spaced apart seismic energy sources 20, 20A near the water surface 16A. In the present example, the equipment 14 on the primary source vessel 10 may, for example, send a control signal to the corresponding equipment 13 on the secondary source vessel 12, such as by radio telemetry, to indicate the time of actuation (firing) of each of the sources 18, 18A towed by the primary source vessel 10. The corresponding equipment 13 may, in response to such signal, actuate the seismic energy sources 20, 20A towed by the secondary source vessel 12.

The seismic energy sources 18, 18A, 20, 20A may be air guns, water guns, marine vibrators, or arrays of such devices. The seismic energy sources are shown as discrete devices in FIG. 3 to illustrate the general principle of seismic signal acquisition. The type of and number of seismic energy sources that can be used in any embodiment is not intended to limit the scope of the disclosure.

In FIG. 3, an OBC 22 is deployed on the bottom 16B of the water 16 such that spaced apart seismic receiver modules 24 are disposed on the water bottom 16B in a preselected pattern. The receiver modules 24 may include a pressure or pressure time gradient responsive seismic sensor, and one or more seismic particle motion sensors, for example, one-component or three-component geophones, or one- or three-component accelerometers (none of the sensors are shown separately). The type of and the number of seismic sensors in each module 24 is not intended to limit the scope of the disclosure. The seismic sensors in each module 24 generate electrical and/or optical signals (depending on the sensor type) in response to, in particular, detected seismic energy resulting from actuations of the seismic energy sources 18, 18A, 20, 20A. In some embodiments, the sensors may comprise pressure or pressure time derivative sensors such as hydrophones, and one or more particle motion responsive sensors such as geophones or accelerometers. In some embodiments, such particle motion responsive sensors may be oriented so as to be sensitive principally (ignoring any cross-component coupling for purposes of explanation) to vertical particle motion. The signals generated by the various sensors may be conducted to a device near the water surface 16A such as a recording buoy 23, which may include a data recorder (not shown separately) for storing the signals for later retrieval and processing by the equipment 14 on the primary source vessel 10, or other processing equipment to be described further below. The data storage functions performed by the recording buoy 23 may be performed by different types of equipment, such as a data storage unit on a recording vessel (not shown) or a recording module (not shown) deployed on the water bottom 16B, e.g., proximate each sensor module 24, or even on the primary or secondary source vessels. Accordingly, the disclosure is not limited in scope to use with a recording buoy or any other specific recording device(s).

Although the description of acquiring signals explained with reference to FIG. 3 is for sensors deployed on the water bottom, it will be appreciated that it is possible to obtain corresponding measurements at any selected depth in the water, using, for example, seismic sensors disposed in a towed cable such as described in U.S. Pat. No. 7,239,577 issued to Tenghamn, et al. Further, the present disclosure is not limited to use with seismic signals acquired in or on the surface of a body of water; methods described herein may also be used with seismic signals acquired on land.

Seismic energy detected by the sensors or receivers generates signals that are recorded for later processing, including by methods according to this disclosure. Such methods may comprise generating a model of materials (e.g., formations) in the Earth, more specifically, the values of one or more parameters related to the physical properties of the materials and their spatial distribution in the Earth. The model may be used to calculate modeled or synthetic seismic signals, that is, signals that would be detected by each of the sensors or receivers such as in FIG. 3, in response to the energy imparted by the sources if the Earth had properties as defined in the model. Differences between the calculated, modeled or synthetic seismic signals, and actual measured (observed) seismic signals may be used to adjust the model and subsequently to repeat performing calculation of the modeled seismic signals. Adjusting the model may comprise changing a value of one or more parameters and/or the spatial distribution of one or more parameters. In this sense, "parameters" may mean any physical property of the formations that will affect propagation of the seismic wavefield, including without limitation, compressional wave (P) velocity, shear wave (S) velocity, density, and fluid content in porous media. The forgoing actions may be repeated until differences between the modeled seismic signals and the observed (measured) seismic signals are reduced to below a predetermined difference limit, or minimized, as explained in the Background section herein. In some embodiments, the foregoing process, which may be referred to as an "inversion process", may be repeated for a predetermined number of cycles each comprising model adjustment, recalculation of the modeled seismic signals and comparison to the observed seismic signals.

Reflections of the seismic wavefield from impedance boundaries in real (measured) seismic data exhibit amplitude vs. offset and angle (AVO/A) phenomena, i.e., the amplitudes R of the reflection events in the seismic data vary with the reflection angle ($\theta$). Amplitude variation for angles to within approximately 10° of the critical angle as explained, for example, in Shuey (1985) and may be represented by the expression:

$$R(\theta)=I+G\sin^2\theta+C(\tan^2\theta-\sin^2\theta) \tag{3}$$

In Eq. (3), I, G and C are the AVO/A intercept, gradient and curvature terms, respectively. These terms are functions of the physical properties of the media (i.e., the subsurface formations). For example, the intercept term may relate to certain physical properties of formations by the expression:

$$I \approx \frac{1}{2}\left(\frac{\Delta c}{c} + \frac{\Delta \rho}{\rho}\right) \tag{3a}$$

wherein c represents the P-wave (compressional wave) velocity and $\rho$ represents bulk density. Seismic reflections modeled with an acoustic wave equation, as explained in the Background section herein, do not correctly exhibit these AVO/A phenomena. For more modest reflection angles, (e.g., $0°<\theta<30°$), which apply in many practical cases, the curvature term may be neglected. However, in other cases, accurate modelling of seismic data would be enhanced by suitably representing AVO/A phenomena.

Figure 1:
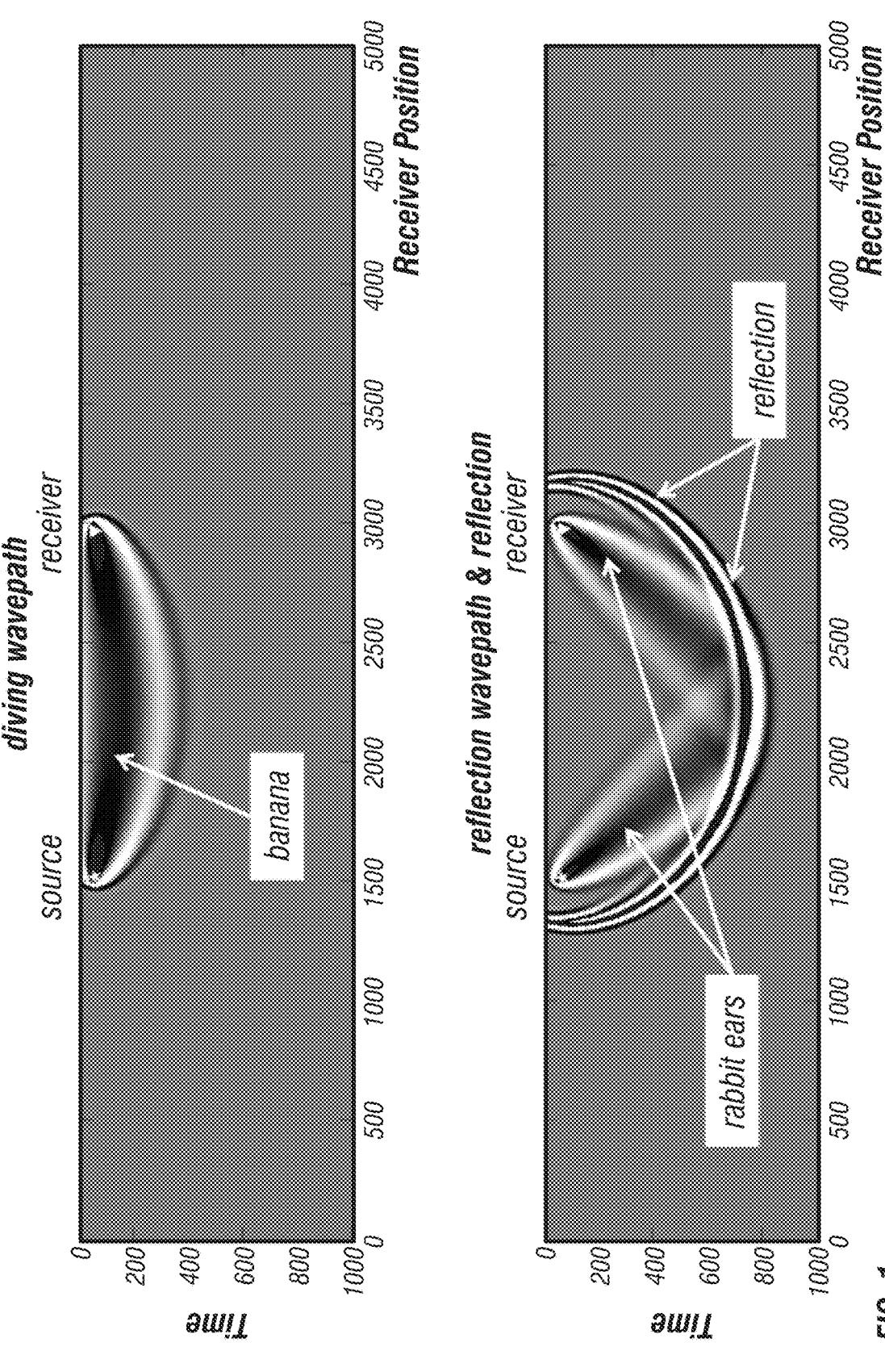
FIG. 1 shows parts of a full waveform inversion (FWI) gradient: The diving wave-path (banana), the reflection wave-path (rabbit ears) and the reflection.

An explanation of a method according to the present disclosure may begin with the variable density acoustic wave equation and may then show how dynamic behavior that is not captured by the P-wave velocity field alone can be modeled by the introduction of additional terms in the variable density acoustic wave equation that act as secondary sources. One of these terms will produce AVO/A intercept behavior that is not captured by the P-wave velocity field alone and a second term will capture the AVO/A gradient behavior. It follows that a third term to capture AVO/A curvature behavior may be readily included, although the present disclosure may omit certain details in the interest of brevity of the explanation. Once it is established how to formulate the foregoing reflectivity terms in a modified isotropic variable density acoustic wave equation (as explained in the Background section herein, an isotropic wave equation does not use shear velocity as a parameter), it then becomes a relatively simple matter to selectively supplement the background velocity field in full waveform inversion (FWI) to generate bananas and/or rabbit ears, e.g., as explained with reference to FIG. 1. For illustrative purposes, the approach may be described using an isotropic wave equation, however, this method readily extends to the anisotropic case. Note that the anisotropic acoustic case will naturally require use the shear velocity as a parameter but will still inadequately describe AVO/AVA without the method herein.

1. The Intercept Term

Beginning with the isotropic variable-density, acoustic, inhomogeneous wave-equation:

$$\frac{1}{\rho c^2}\frac{\partial^2 u}{\partial t^2} = \nabla \cdot \left(\frac{1}{\rho}\nabla u\right) + s \tag{4}$$

in which, the scalar wavefield, the source term, the bulk density, the P-wave velocity and time are denoted by u, s, $\rho$, c and t respectively, the above wave equation may be rearranged, and making use of the product rule it may be observed that:

$$\frac{1}{c^2}\frac{\partial^2 u}{\partial t^2} = \rho\nabla \cdot \left(\frac{1}{\rho}\nabla u\right) + \rho s \tag{5}$$

$$= \nabla^2 u + \rho\nabla\frac{1}{\rho}\cdot\nabla u + \rho s$$

$$= \nabla^2 u - \nabla(\log\rho)\cdot\nabla u + \rho s$$

-continued $$= \nabla^2 u - \frac{1}{\rho}\nabla\rho \cdot \nabla u + \rho s$$

Bulk density contrasts can be modeled using an additional secondary source term, $-\nabla(\log \rho)\cdot\nabla u$, (or alternatively, $$-\frac{1}{\rho}\nabla\rho \cdot \nabla u)$$

in a constant density wave equation. The second interpretation shows a direct correspondence with the density contribution to the intercept term in the AVO/A equation, as shown by the expression:

$$R(\theta = 0) = \frac{1}{2}\left(\frac{\Delta c}{c} + \frac{\Delta\rho}{\rho}\right) \tag{6}$$

As a result it may be observed that this modified acoustic wave equation may be written in terms of a dot product between a spatially-varying vector parameter field $r_1$ and with the gradient of the scalar wavefield, $\nabla u$, to produce intercept-like scattering as in the expression:

$$\frac{1}{c^2}\frac{\partial^2 u}{\partial t^2} = \nabla^2 u - r_I \cdot \nabla u + \rho s \tag{7}$$

in which the new term, $r_1 \cdot \nabla u$ has been emphasized. It is important to note that although the above Eq. (7) was developed to model scattering due to density variations, any other suitable parameter field may be chosen to produce scattering behavior in modeled seismic data. For example, in the case that the background velocity field, c, is smooth, the additional term in Eq. (7) could be used to generate intercept-like scattering. In such case, the intercept parameter field $r_1$ can take on a role similar to $\nabla(\log \rho + \log c) = \nabla \log \rho c = \nabla \log Z$. Note here that Z is the acoustic impedance. Similar reasoning may be applied to any earth formation parameters that generate scattering due to abrupt changes in value (e.g., change with respect to spatial position), for example P-wave velocity, shear-wave velocity, bulk density, P-wave impedance and shear-wave impedance.

It follows that the introduction of other secondary source terms could serve other purposes, for example, to introduce AVO/A gradient-like and/or AVO/A curvature-like scattering behavior. However, for these a directional aspect is required in the secondary source term.

2. The Gradient Term

For the AVO/A gradient term, one may introduce an additional secondary source term to the modified acoustic wave equation, e.g., Eq. (7), that has $\sin^2 \theta$ directivity. This additional secondary source term depends upon a gradient-related vector parameter field $r_G$. The modified wave equation, Eq. (7) then becomes:

$$\frac{1}{c^2}\frac{\partial^2 u}{\partial t^2} = \nabla^2 u - \vec{r}_I \cdot \nabla u - \vec{r}_G \cdot \sin^2\theta\nabla u + \rho s \tag{8}$$

in which the new gradient term has been emphasized. Unless there is any ambiguity, in what follows one may omit the subscript G. A useful mathematical approach may be to produce the directivity behavior using a finite difference stencil.

Figure 2:
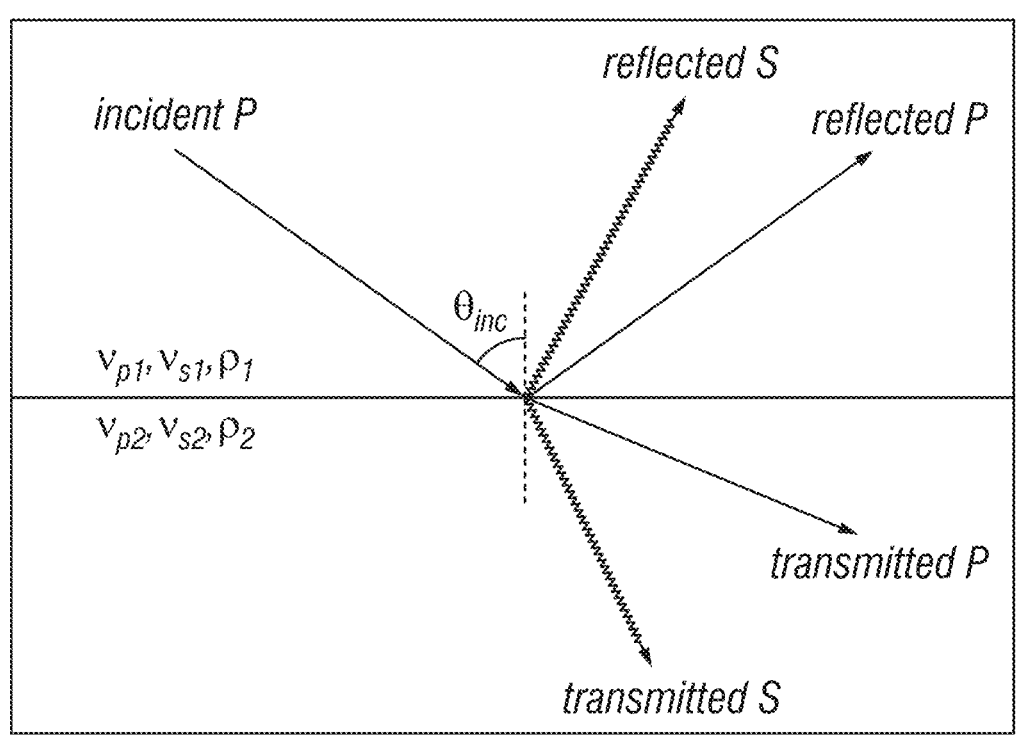
FIG. 2 shows that at a boundary between two media, an incident P-wave will be partially reflected and transmitted and will also undergo partial mode conversion into S-waves.

The sine of the angle between the incident wavefront normal and the normal to a parameter boundary, e.g., as shown in FIG. 2, can be determined from the vector cross-product, $\nabla r \times \nabla u$, since $|\nabla r \times \nabla u| = |\nabla r||\nabla u| \sin \theta$.

Figure 4:
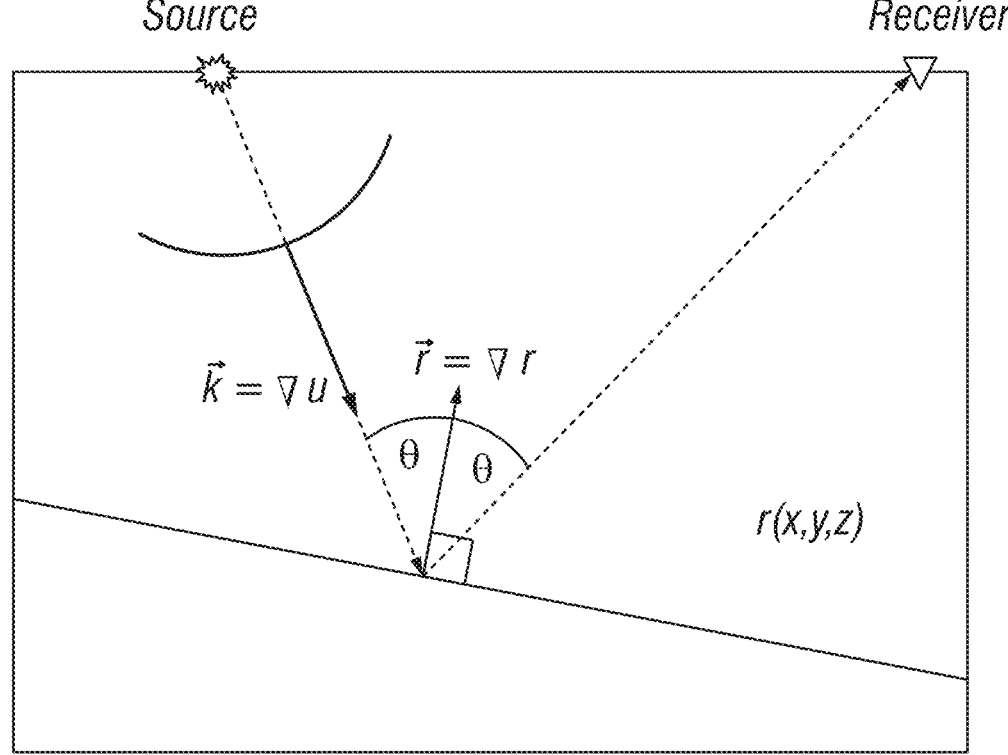
FIG. 4 shows the virtual secondary source wavefield reflecting off a boundary. The orientation of the incident wavefront normal, and the normal to the boundary, may be used to determine the sine of the angle of incidence using the cross product.

FIG. 4 shows a virtual secondary source wavefield reflecting off a boundary. The orientation of the incident wavefront normal, and the normal to the boundary, $\nabla r$ may be used to determine the sine of the angle of incidence using the cross product, $|\nabla r \times \nabla u| = |\nabla r||\nabla u| \sin \theta$.

Consider the gradient of a scalar wavefield u, $$\nabla u = \left(\frac{\partial}{\partial x}\hat{x} + \frac{\partial}{\partial y}\hat{y} + \frac{\partial}{\partial z}\hat{z}\right)u \tag{9}$$

and assume that u is the plane monochromatic wave represented by the expression, $$u = e^{-i(\omega t - k_x x - k_y y - k_z z)} \tag{10}$$

then the gradient of the scalar wavefield is given by the expression:

$$\nabla u = i(k_x\hat{x} + k_y\hat{y} + k_z\hat{z})u \tag{11}$$

The normal to the reflecting boundary can be estimated by taking the gradient of a suitable physical field, r (e.g., density, S-wave velocity or P-wave velocity):

$$\vec{r} = \nabla r = \left(\frac{\partial}{\partial x}\hat{x} + \frac{\partial}{\partial y}\hat{y} + \frac{\partial}{\partial y}\hat{z}\right)r \tag{12}$$

whose values are different in different physical media. This is typically the field that will be used to induce AVO/A effects into modeled reflections. For convenience, the notation, $r_x = \partial r/\partial x$ may be adopted, so that:

$$\vec{r} = \nabla r = r_x\hat{x} + r_y\hat{y} + r_z\hat{z} \tag{13}$$

The cross product of the wavefront normal and the normal to the reflecting boundary may be given by the expression:

$$|\nabla u \times \vec{r}| = |\nabla u||\vec{r}| \sin \theta \tag{14}$$

and the directivity required may be given by the expression:

$$\sin^2\theta = \frac{|\nabla u \times \vec{r}|^2}{|\nabla u|^2|\vec{r}|^2} \tag{15}$$

$$= \frac{k_x^2(r_y^2 + r_z^2) + k_y^2(r_x^2 + r_z^2) + k_z^2(r_x^2 + r_y^2) - 2k_x k_y r_x r_y - 2k_x k_z r_x r_z - 2k_y k_z r_y r_z}{(k_x^2 + k_y^2 + k_z^2)(r_x^2 + r_y^2 + r_z^2)}$$

This means that the directivity of the secondary source term with $\sin^2 \theta$ behavior can be constructed by applying an operator that is a combination of the components of the parameter field to the gradient of the wavefield, $\nabla u$:

$$\sin^2\theta = \frac{|\nabla u \times \vec{r}|^2}{|\nabla u|^2|\vec{r}|^2} \tag{16}$$

-continued $$= \frac{k_x^2\left(r_y^2 + r_z^2\right) + k_y^2\left(r_x^2 + r_z^2\right) + k_z^2\left(r_x^2 + r_y^2\right) - 2k_x k_y r_x r_y - 2k_x k_z r_x r_z - 2k_y k_z r_y r_z}{\left(k_x^2 + k_y^2 + k_z^2\right)\left(r_x^2 + r_y^2 + r_z^2\right)}$$

Define:

$$v = \frac{u}{k_x^2 + k_y^2 + k_z^2} = \frac{u}{k^2}, \tag{17}$$

so that $\nabla v = \nabla u / k^2$ and then:

$$\sin^2\theta \nabla u = \sin^2\theta k^2 \nabla v = \frac{k_x^2\left(r_y^2 + r_z^2\right) + k_y^2\left(r_x^2 + r_z^2\right) + k_z^2\left(r_x^2 + r_y^2\right) - 2k_x k_y r_x r_y - 2k_x k_z r_x r_z - 2k_y k_z r_y r_z}{r_x^2 + r_y^2 + r_z^2} \nabla v \tag{18}$$

It remains to complete the new AVO/A term by applying the negative gradient of the parameter field:

$$-\vec{r}_G \cdot \sin^2\theta k^2 \nabla v = -\vec{r}_G \cdot \frac{k_x^2\left(r_y^2 + r_z^2\right) + k_y^2\left(r_x^2 + r_z^2\right) + k_z^2\left(r_x^2 + r_y^2\right) - 2k_x k_y r_x r_y - 2k_x k_z r_x r_z - 2k_y k_z r_y r_z}{r_x^2 + r_y^2 + r_z^2} \nabla v \tag{19}$$

Noting the Fourier duals $$k_x^2 = -\partial^2 / \partial x^2$$

and $k_x k_y = -\partial^2 / \partial x \partial y$, re-introducing the partial differential operators in the numerator provides the expression:

$$-\vec{r}_G \cdot \sin^2\theta k^2 \nabla v = \ldots \vec{r}_G \cdot \frac{\left(r_y^2 + r_z^2\right)\frac{\partial^2}{\partial x^2} + \left(r_x^2 + r_z^2\right)\frac{\partial^2}{\partial y^2} + \left(r_x^2 + r_y^2\right)\frac{\partial^2}{\partial z^2} - 2r_x r_y \frac{\partial^2}{\partial x \partial y} - 2r_x r_z \frac{\partial^2}{\partial x \partial z} - 2r_y r_z \frac{\partial^2}{\partial y \partial z}}{r_x^2 + r_y^2 + r_z^2} \nabla v \tag{20}$$

It should be noted that the product with $\nabla v$ generates triple partial derivatives of the wavefield.

There remains the calculation of the auxiliary field, $v$. One approach is to assume that the isotropic dispersion relation, $$\omega^2 / c^2 = k_x^2 + k_y^2 + k_z^2,$$

holds, in which case it is possible to re-arrange Eq. (8) so that $\omega^2 v = c^2 u$. Recognizing the Fourier transform pair, $\partial^2 / \partial t^2 \Leftrightarrow -\omega^2$, one may write that:

$$\frac{\partial^2}{\partial t^2} v = -c^2 u \tag{21}$$

which admits a solution for $v$ by double time integration of $-c^2 u$.

Having shown herein how the intercept and gradient terms can be introduced as secondary sources if it is denoted that a scatterer generating parameter field, $r_j$ that has a directivity, described by an operator, $D_j$, in principle it is possible to generalize the modified wave-equation for n secondary source terms as follows:

$$\frac{1}{c^2}\frac{\partial^2 u}{\partial t^2} = \nabla^2 u - \sum_{j=1}^{n}\vec{r}_j \cdot D_j \nabla v_j + \rho s, \tag{22}$$

in which it is assumed that in the most general case n auxiliary fields are required. A summary of the different forms of the wave equation discussed can be seen in Table 2 below

TABLE 2

Forms of the Acoustic Wave Equation for Modelling AVO/A Phenomena

| Form of wave equation | Equation | Secondary source physical phenomena represented |
|---|---|---|
| Isotropic acoustic wave equation with constant density | $\frac{1}{c^2}\frac{\partial^2 u}{\partial t^2} = \nabla^2 u + \rho s$ | N/A |
| Isotropic acoustic wave equation with variable density | $\frac{1}{c^2}\frac{\partial^2 u}{\partial t^2} = \nabla^2 u - \nabla(\log \rho) \cdot \nabla u + \rho s$ | Bulk density contrast |
| Isotropic acoustic augmented wave equation 1 | $\frac{1}{c^2}\frac{\partial^2 u}{\partial t^2} = \nabla^2 u - r_I \cdot \nabla u + \rho s$ | Change in earth formation parameter (e.g. AVO/A intercept) |

TABLE 2-continued

Forms of the Acoustic Wave Equation for Modelling AVO/A Phenomena

| Form of wave equation | Equation | Secondary source physical phenomena represented |
|---|---|---|
| Isotropic acoustic augmented wave equation 2 | $\frac{1}{c^2}\frac{\partial^2 u}{\partial t^2} = \nabla^2 u - r_I \cdot \nabla u - r_G \cdot \sin^2\theta\nabla u + \rho s$ | Change in earth formation parameter (e.g. AVO/A intercept) and AVO/A gradient |
| Isotropic acoustic augmented wave equation 3 | $\frac{1}{c^2}\frac{\partial^2 u}{\partial t^2} = \nabla^2 u - \sum_{j=1}^{n} r_j \cdot D_j \nabla v_j + \rho s$ | This is the sum of many secondary sources representing, for example, intercept, gradient and curvature |

Summary of the Method

Herein is described a method in which the acoustic wave equation (see Eq. 5 for the isotropic case), that is, a wave equation that uses compressional velocity as a velocity and bulk density as parameters, may be augmented with secondary source terms to represent scattering of various types, in particular so that AVO/A behavior may be represented in synthetic seismic signals or data. Because the secondary source terms can be designed to have appropriate directivity, they may be used to model aspects of wavefield behavior normally only possible with an elastic wave equation. As an example, it has been shown how the augmented acoustic wave equation given by Eq. (8), along with an auxiliary equation, e.g., Eq. (22):

$$\frac{1}{c^2}\frac{\partial^2 u}{\partial t^2} = \nabla^2 u - \vec{r}_I \cdot \nabla u - \vec{r}_G \cdot \sin^2\theta k^2 \nabla u + \rho s \qquad (23)$$

$$\frac{\partial^2 v}{\partial t^2} = -c^2 u$$

may be used to model the AVO/A behavior suggested by the 2-term approximation described in Shuey (1985). The intercept term may be given by $-\vec{r}_I \cdot \nabla u$ and the AVO/A gradient term may be given by $-\vec{r}_G \cdot k^2 \sin^2 \theta \nabla v$. This augmented acoustic wave equation requires an auxiliary parameter field, v, which is the solution of the auxiliary equation, Eq. (23). Using the augmented acoustic wave equation to synthesize seismic data or its adjoint to backproject seismic data into the image space can yield results more similar to those that may be obtained using the full elastic wave equation but at much reduced computational cost.

Since it has been shown how to determine the sine of the incident angle using the vector cross-product, it will be appreciated that it is possible to derive the cosine using the vector dot-product. Consequently, it follows that it is possible to include a secondary source term representing AVO/A curvature. The directivity of these secondary source terms is not limited to those described. Indeed, a wide range of other forms could also be considered for a variety of purposes.

This type of augmented wave equation may be used to model seismic wavefields, produce seismic images and perform full waveform inversion (FWI) much more efficiently than using an elastic wave equation. Using this approach it may be possible to produce estimates of a range of parameters such as intercept, gradient, curvature, density, attenuation and velocity-related fields.

By using such reflectivity terms in a FWI setting, the reflectivity terms may be used selectively to supplement the velocity field in order to control the generation of reflections and reflection wave-paths in the FWI gradient. Since this technique permits a separation of the propagation and scattering terms, not only does it naturally lend itself to Born modelling, but it has also been reported to make, "the inversion problem significantly more linear" (Verschuur et al., 2016).

Figure 5:
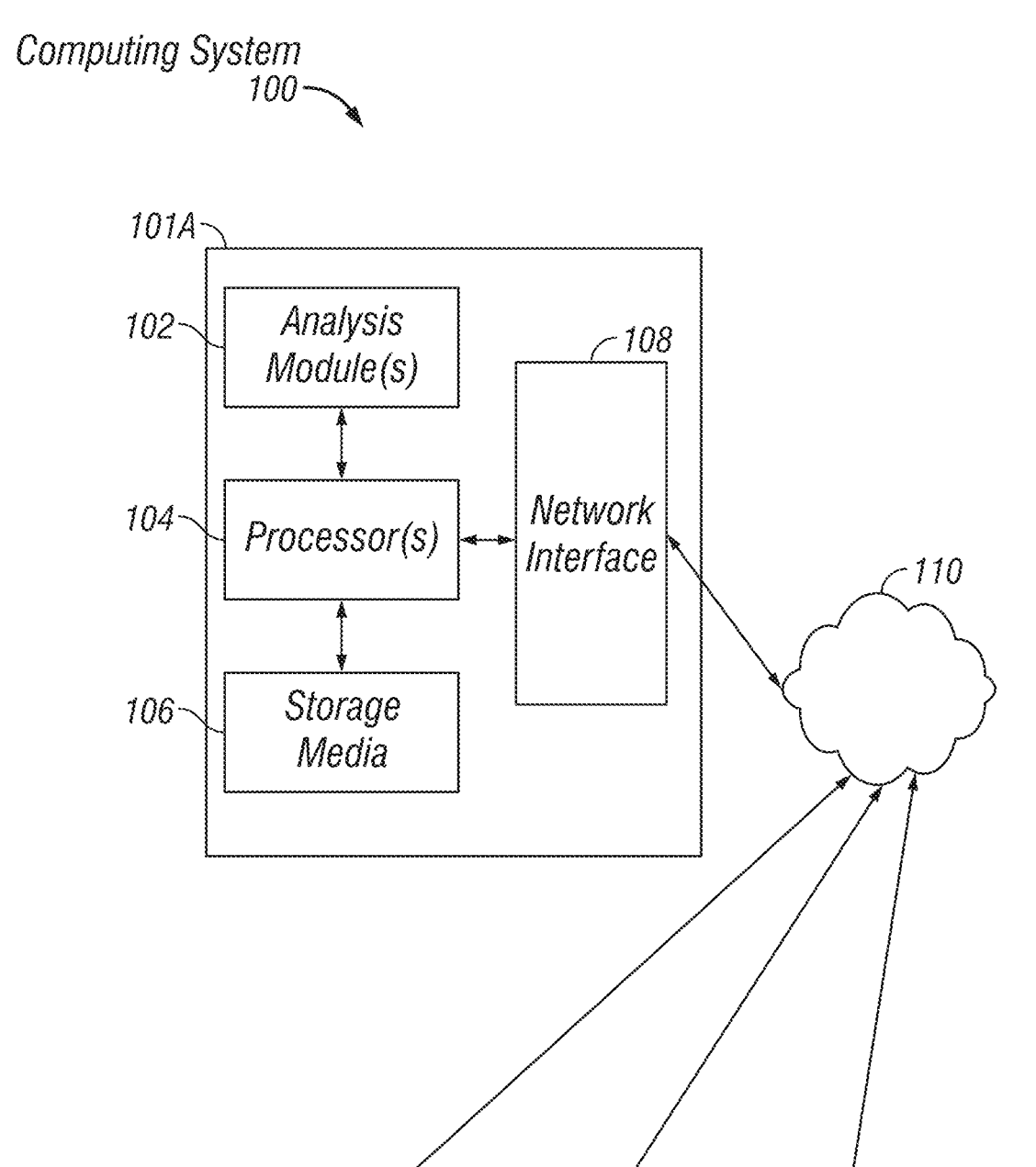
FIG. 5 shows an example embodiment of a computer system that may be used in accordance with the present disclosure.

The foregoing process may be implemented on any form of computer or computer system programmed to perform the actions described. FIG. 5 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIG. 5. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 5 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 5, and/or the computing system 100 may have a different configuration or arrangement of the components shown in FIG. 5. The various components shown in FIG. 5 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, GPUs, coprocessors or other appropriate devices. These modules, combinations of these modules, and/or their combination with general hardware are all included within the scope of the present disclosure.

REFERENCES CITED IN THE DISCLOSURE

Aki, K., and Richards, P. G., 1980, *Quantitative seismology theory and methods*, Volume 1, W.H. Freeman and Company, New York.

Plessix, R.-E., 2006, *A review of the adjoint-state method for computing the gradient of a functional with geophysical application*, Geophysical Journal International, 167, 2, 495-503

Shuey, R. T., 1985, *A simplification of the Zoeppritz equations, Geophysics,* 50(4), 609-614.

Tarantola, A., 1984, *Inversion of seismic reflection data in the acoustic approximation,* Geophysics, 49, 8, 1259-1266

Verschuur, D. J., Staal, X. R. and A. J. Berkhout, 2016, *Joint migration inversion: Simultaneous determination of velocity fields and depth images using all orders of scattering,* The Leading Edge 35: 1037-1046.

Zoeppritz, Karl, 1919, *VIIb. Über Reflexion and Durchgang seismischer Wellen durch Unstetigkeitsflächen,* [VIIb. On reflection and transmission of seismic waves by surfaces of discontinuity], Nachrichten von der Königlichen Gesellschaft der Wissenschaften zu Göttingen, Mathematisch-physikalische Klasse, 66-84.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for producing an image of spatial distribution of subsurface elastic wave propagation parameters for seismic exploration, comprising, in a computer:

calculating expected seismic signals based on an arrangement of at least one seismic source and at least one seismic receiver and based on an initial model of Earth's subsurface, the at least one seismic source and the at least one seismic receiver disposed proximate a volume of subsurface to be analyzed, the initial model comprising spatial distribution of at least one parameter related to propagation of elastic waves in subsurface formations in the volume, the calculating comprising entering the initial model into an acoustic wave equation modified by at least one secondary source term, the at least one secondary source term used to estimate amplitude versus offset and/or angle (AVO/A) phenomena in the calculated expected seismic signals, the acoustic wave equation requiring modification by the at least one secondary source term to perform the estimation;

comparing the calculated expected seismic signals with measured seismic signals from the at least one sensor obtained as a result of actuating the at least one seismic source;

determining differences between the calculated seismic signals and the measured seismic signals;

using an inversion method to adjust the initial model and repeating the calculating, comparing and determining until the differences fall below a selected difference limit to generate a final model of spatial distribution of the at least one parameter; and using the final model to produce a seismic image of the subsurface.

2. The method of claim 1 wherein the adjusting comprises changing at least one of a value of the at least one parameter and/or the spatial distribution.

3. The method of claim 2 wherein the at least one secondary source term represents reflectivity.

4. The method of claim 3 wherein the reflectivity results from changes in at the least one parameter.

5. The method of claim 4 wherein the at least one parameter comprises compressional (P) wave velocity.

6. The method of claim 4 wherein the at least one parameter comprises shear(S) wave velocity.

7. The method of claim 4 wherein the at least one parameter comprises density.

8. The method of claim 4 wherein the at least one parameter comprises compressional (P) wave impedance.

9. The method of claim 4 wherein the at least one parameter comprises shear(S) wave impedance.

10. The method of claim 4 wherein the at least one parameter comprises elastic impedance.

11. The method of claim 4 wherein the at least one parameter comprises at least one component of an elastic tensor.

12. The method of claim 4 wherein the at least one parameter comprises attenuation.

13. The method of claim 4 further comprising producing a reflectivity image from the adjusted initial earth model.

14. The method of claim 13 further comprising selectively modifying the at least one parameter and/or a strength of the at least one secondary source term in order to control production of diving wave-paths (bananas) and reflection wave-paths (rabbit ears) as substantially separate terms in a gradient of an objective function of a full waveform inversion.

15. The method of claim 13 further comprising selectively modifying the at least one parameter and/or a strength of the at least one secondary source term in order to produce substantially only diving wave-paths (bananas) in a gradient of an objective function of a full waveform inversion.

16. The method of claim 13 further comprising selectively modifying the at least one parameter and/or a strength of the at least one secondary source term in order to produce substantially only reflection wave-paths (rabbit ears) in a gradient of an objective function of a full waveform inversion.

17. The method of claim 4 wherein the reflectivity is expressed as the grad of a spatially-variable scalar parameter field.

18. The method of claim 1 wherein the at least one secondary source term estimates reflecting or scattering an incident wavefield with directional variations.

19. The method of claim 1 wherein the at least one secondary source term estimates reflectivity corresponding to an AVO/A intercept attribute.

20. The method of claim 1 wherein the at least one secondary source term comprises reflectivity corresponding to an AVO/A gradient attribute.

21. The method of claim 1 wherein the at least one secondary source term comprises reflectivity corresponding to an AVO/A curvature attribute.

22. The method of claim 1 further comprising injecting resulting secondary source terms into a different wavefield from that which their values depend on.

23. The method of claim 1 further comprising Born modelling.

24. The method of claim 1 wherein a termination criterion of the inversion method comprises a predetermined number of repetitions.

25. The method of claim 1 wherein a termination criterion of the inversion comprises a predetermined similarity between the calculated seismic signals and the measured seismic signals.

26. A computer program stored in a non-transitory computer readable medium, the program having logic operable to cause a programmable computer to perform a process for generating a subsurface image of elastic wave propagation property parameters for seismic exploration, the process comprising:

calculating expected seismic signals based on an arrangement of at least one seismic source and at least one seismic receiver and based on an initial model of Earth's subsurface, the at least one seismic source and the at least one seismic receiver disposed proximate a volume of subsurface to be analyzed, the initial model comprising spatial distribution of at least one parameter related to propagation of elastic waves in subsurface formations in the volume, the calculating comprising entering the initial model into an acoustic wave equation modified by at least one secondary source term, the at least one secondary source term used to estimate amplitude versus offset and/or angle (AVO/A) phenomena in the calculated expected seismic signals, the acoustic wave equation requiring modification by the at least one secondary source term to perform the estimation;

comparing the calculated expected seismic signals with measured seismic signals obtained from the at least one seismic sensor in response to actuating the at least one source;

determining differences between the calculated seismic signals and the measured seismic signals;

using an inversion method to adjust the initial model and repeating the calculating, comparing and determining until the differences fall below a selected difference limit to generate a final model of spatial distribution of the at least one parameter; and generating an image of the spatial distribution of the at least one parameter using the final model.

27. The computer program of claim 26 wherein the adjusting comprises changing at least one of a value of the at least one parameter and/or the spatial distribution.

28. The computer program of claim 27 wherein the at least one secondary source term represents reflectivity.

29. The computer program of claim 28 wherein the reflectivity results from changes in the at least one parameter.

30. The computer program of claim 29 wherein the at least one parameter comprises compressional (P) wave velocity.

31. The computer program of claim 29 wherein the at least one parameter comprises shear(S) wave velocity.

32. The computer program of claim 29 wherein the at least one parameter comprises density.

33. The computer program of claim 29 wherein the at least one parameter comprises compressional (P) wave impedance.

34. The computer program of claim 29 wherein the at least one parameter comprises shear(S) wave impedance.

35. The computer program of claim 29 wherein the at least one parameter comprises elastic impedance.

36. The computer program of claim 29 wherein the at least one parameter comprises at least one component of an elastic tensor.

37. The computer program of claim 29 wherein the at least one parameter comprises attenuation.

38. The computer program of claim 29 wherein the logic is further operable to cause the computer to perform producing a reflectivity image from the adjusted initial earth model.

39. The method of claim 38 wherein the reflectivity is expressed as the grad of a spatially-variable scalar parameter field.

40. The computer program of claim 39 wherein the logic is further operable to cause the computer to perform selectively modifying the at least one parameter and/or a strength of the at least one secondary source term in order to control production of diving wave-paths (bananas) and reflection wave-paths (rabbit ears) as substantially separate terms in a gradient of an objective function of a full waveform inversion.

41. The computer program of claim 39 wherein the logic is further operable to cause the computer to perform selectively modifying the at least parameter and/or a strength of the at least one secondary source term in order to substantially produce only diving wave-paths (bananas) in a gradient of an objective function of a full waveform inversion.

42. The computer program of claim 39 wherein the logic is further operable to cause the computer to perform selectively modifying the at least one parameter and/or a strength of the at least one secondary source term in order to produce substantially only reflection wave-paths (rabbit ears) in a gradient of an objective function of a full waveform inversion.

43. The computer program of claim 26 wherein the at least one secondary source term estimates reflecting or scattering an incident wavefield with directional variations.

44. The computer program of claim 26 wherein the at least one secondary source term estimates reflectivity corresponding to an AVO/A intercept attribute.

45. The computer program of claim 26 wherein the at least one secondary source term estimates reflectivity corresponding to an AVO/A gradient attribute.

46. The computer program of claim 26 wherein the at least one secondary source term estimates reflectivity corresponding to an AVO/A curvature attribute.

47. The computer program of claim 26 further comprising injecting resulting secondary source terms into a different wavefield from that which their values depend on.

48. The computer program of claim 26 wherein the logic is further operable to cause the computer to perform Born modelling.

49. The computer program of claim 26 wherein a termination criterion of the inversion comprises a predetermined number of repetitions.

50. The computer program of claim 26 wherein a termination criterion of the inversion comprises a predetermined similarity between the calculated and measured signals.

* * * * *